United States Patent
Xu

(10) Patent No.: US 10,270,736 B2
(45) Date of Patent: Apr. 23, 2019

(54) ACCOUNT ADDING METHOD, TERMINAL, SERVER, AND COMPUTER STORAGE MEDIUM

(71) Applicant: Tencent Technology (Shenzhen) Company Limited, Shenzhen (CN)

(72) Inventor: Dongcheng Xu, Shenzhen (CN)

(73) Assignee: TENCENT TECHNOLOGY (SHENZHEN) COMPANY LIMITED, Shenzhen, Guangdong Province (CN)

(*) Notice: Subject to any disclaimer, the term of this patent is extended or adjusted under 35 U.S.C. 154(b) by 0 days.

(21) Appl. No.: 15/697,156

(22) Filed: Sep. 6, 2017

(65) Prior Publication Data

US 2018/0013718 A1    Jan. 11, 2018

Related U.S. Application Data

(63) Continuation-in-part of application No. PCT/CN2016/085789, filed on Jun. 15, 2016.

(30) Foreign Application Priority Data

Nov. 17, 2015    (CN) .......................... 2015 1 0791070

(51) Int. Cl.
*H04L 29/12* (2006.01)
*G10L 15/02* (2006.01)
(Continued)

(52) U.S. Cl.
CPC .......... *H04L 61/1594* (2013.01); *G10L 15/26* (2013.01); *G10L 17/02* (2013.01);
(Continued)

(58) Field of Classification Search
CPC ....................... H04L 61/1594; H04M 3/42008
(Continued)

(56) References Cited

U.S. PATENT DOCUMENTS

| 8,917,848 B2* | 12/2014 | Torgersrud | .............. | H04M 3/38 |
| | | | | 379/142.05 |
| 9,906,642 B2* | 2/2018 | Jing | ........................ | H04M 1/66 |

(Continued)

FOREIGN PATENT DOCUMENTS

| CN | 103118000 A | 5/2013 |
| CN | 103581109 A | 2/2014 |

(Continued)

OTHER PUBLICATIONS

"Voiceprint Recognition Systems for Remote Authentication"—Saquib et al, International Journal of Hybrid Information Technology vol. 4, No. 2, Apr. 2011 https://pdfs.semanticscholar.org/7682/396df53dc6b48a9b0f98692388b7661e16ed.pdf.*

(Continued)

*Primary Examiner* — Randy A Scott
(74) *Attorney, Agent, or Firm* — Morgan, Lewis & Bockius LLP

(57) ABSTRACT

An account adding method is performed by a social networking application running at a mobile terminal when communicating with a second terminal (e.g., using a chat session). The method includes: recording voice information from the second terminal using the social networking application; extracting character string information and voiceprint information from the voice information; sending the character string information and the voiceprint information to a server; receiving an account that matches the character string information and the voiceprint information and that is sent by the server; and adding the account to a contact list of the social networking application. For example, the social networking application is started before starting a telephone call with the second terminal and the voice information is recorded during the telephone call.

19 Claims, 5 Drawing Sheets

(51) Int. Cl.
*G10L 15/26* (2006.01)
*H04L 12/58* (2006.01)
*H04L 29/06* (2006.01)
*H04W 4/21* (2018.01)
*G10L 17/02* (2013.01)
*G10L 17/04* (2013.01)
*G10L 17/08* (2013.01)
*G10L 17/14* (2013.01)
*G10L 15/08* (2006.01)

(52) U.S. Cl.
CPC .............. *G10L 17/04* (2013.01); *G10L 17/08* (2013.01); *G10L 17/14* (2013.01); *H04L 51/32* (2013.01); *H04L 67/42* (2013.01); *H04W 4/21* (2018.02); *G10L 15/02* (2013.01); *G10L 15/08* (2013.01); *H04L 51/04* (2013.01)

(58) Field of Classification Search
USPC ..... 709/203, 205, 206, 227, 228; 379/88.12, 379/88.13, 88.14, 93.03
See application file for complete search history.

(56) References Cited

U.S. PATENT DOCUMENTS

| | | | |
|---|---|---|---|
| 2004/0190688 A1* | 9/2004 | Timmins | H04M 3/4878 379/88.02 |
| 2010/0199340 A1* | 8/2010 | Jonas | G06Q 10/10 726/8 |
| 2016/0065558 A1* | 3/2016 | Suresh | H04L 63/08 726/7 |
| 2017/0163797 A1* | 6/2017 | Jing | H04M 1/66 |

FOREIGN PATENT DOCUMENTS

| | | |
|---|---|---|
| CN | 104735634 A | 6/2015 |
| EP | 1496678 A2 | 1/2005 |

OTHER PUBLICATIONS

Tencent Technology, ISRWO, PCT/CN2016/085789, Sep. 18, 2016, 9 pgs.
Tencent Technology, IPRP, PCT/CN2016/085789, May 22, 2018, 7 pgs.

* cited by examiner

ACCOUNT ADDING METHOD, TERMINAL, SERVER, AND COMPUTER STORAGE MEDIUM

RELATED APPLICATIONS

This application is a continuation-in-part application of PCT/CN2016/085789, entitled "METHOD FOR ADDING ACCOUNT, TERMINAL, SERVER, AND COMPUTER STORAGE MEDIUM" filed on Jun. 15, 2016, which claims priority to Chinese Patent Application No. 201510791070.8, filed with the State Intellectual Property Office of the People's Republic of China on Nov. 17, 2015, and entitled "ACCOUNT ADDING METHOD, TERMINAL, AND SERVER", both of which are incorporated herein by reference in their entirety.

FIELD OF THE TECHNOLOGY

This application relates to account management technologies in the social field, and in particular, to an account adding method, a terminal, a server, and a computer readable storage medium.

BACKGROUND OF THE DISCLOSURE

With rapid development of social networks, increasing users frequently use social networking applications (APP, application) to exchange information. When social networking APPs are being used, friends usually need to be added to a contact list. The most common and direct friend adding method is querying a social number of a counterpart. When the counterpart states a social number of the counterpart, a user needs to enter many characters on a friend adding page, and sometimes needs to repeatedly confirm whether the entered characters are correct. Especially when a social number of a counterpart is relatively long and complex, a user having a poor memory usually misses a character or enters a character by mistake.

In addition, different people have different speech rates, and some people speak with non-standard intonations or with dialects or accents. This makes it difficult for a user to enter characters. Moreover, a social number generally includes a letter, a digit, and a special character. For a mobile device, it usually requires a switch between an alphabetic keyboard and a numeric symbol keyboard, making a friend adding operation extremely inconvenient.

SUMMARY

Embodiments of this application provide an account adding method, a terminal, a server, and a computer readable storage medium.

An embodiment of this application provides an account adding method, including:
collecting voice information;
extracting character string information and voiceprint information from the voice information;
sending the character string information and the voiceprint information to a server;
receiving an account that matches the character string information and the voiceprint information and that is sent by the server; and
adding the account to a contact list.

Another embodiment of this application provides an account adding method, including:

receiving character string information and voiceprint information that are sent by a terminal;
searching a database for an account matching the character string information and the voiceprint information; and
sending the account matching the character string information and the voiceprint information to the terminal, so that the terminal adds the account to a contact list.

An embodiment of this application provides a terminal, including:
a collection unit, configured to collect voice information;
an extraction unit, configured to parse the voice information, and extract character string information and voiceprint information;
a sending unit, configured to send the character string information and the voiceprint information to a server;
a receiving unit, configured to receive an account that matches the character string information and the voiceprint information and that is sent by the server; and
an adding unit, configured to add the account to a contact list.

An embodiment of this application provides a server, including:
a receiving unit, configured to receive character string information and voiceprint information that are sent by a terminal;
a searching unit, configured to search a database for an account matching the character string information and the voiceprint information; and
a sending unit, configured to send the account matching the character string information and the voiceprint information to the terminal, so that the terminal adds the account to a contact list.

An embodiment of this application provides a computer readable storage medium storing a plurality of computer programs, the computer programs are used for executing the foregoing account adding method.

DESCRIPTION OF EMBODIMENTS

Figure 1:
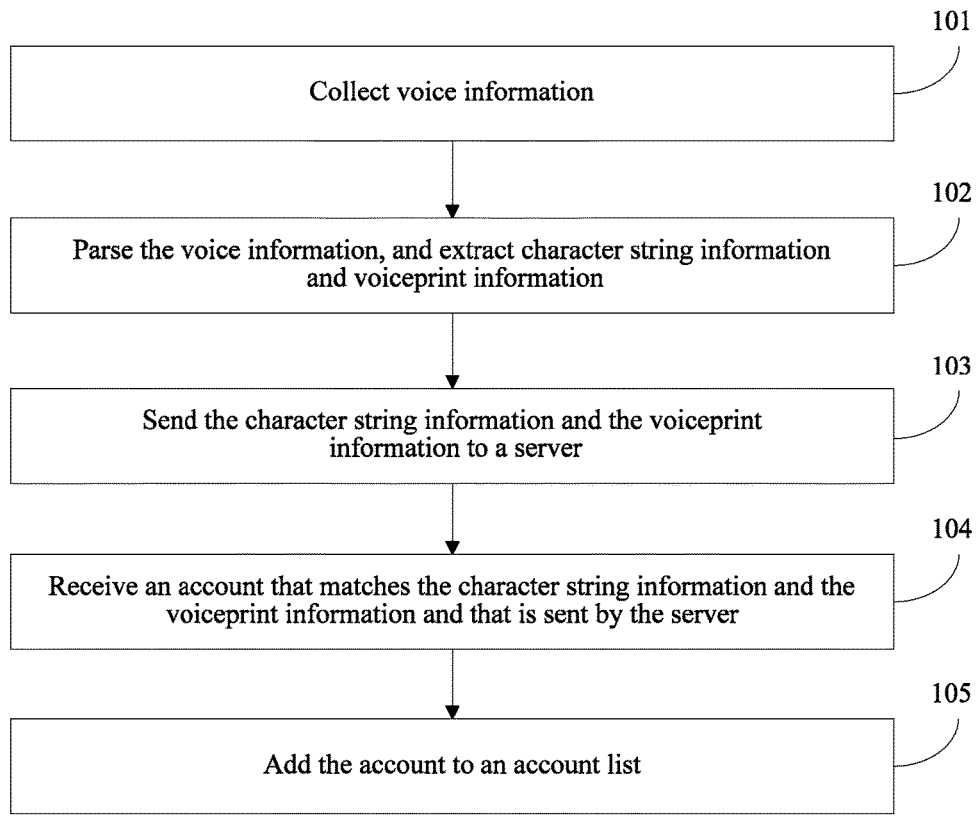
FIG. 1 is a schematic flowchart of an account adding method according to Embodiment 1 of this application.

For better understanding of the features and technical content of the embodiments of this application, the following describes the embodiments of this application with reference to the accompanying drawings. The accompanying drawings are provided for reference only, and are not intended to limit the embodiments of this application.

The embodiments of this application implement adding of a friend's account based on a speech recognition technology. Products based on the speech recognition technology include speech input, speech-to-text in WeChat, and the like. In the speech recognition technology, digits, letters, and the like may be relatively exactly recognized. Even though speech is affected by regional dialects or personal speech habits, the speech may be recognized well by using the speech recognition technology. In the embodiments of this application, the speech recognition technology is used for extracting a personal account (also referred to as a social number) from speech, so as to avoid entering a complex account during friend adding, making it more convenient to add a friend. Technical solutions in the embodiments of this application are especially suitable for people who do not use handwriting easily, such as the elder, the handicapped, and children.

Compared with adding a friend by means of speech in the existing technology, in the embodiments of this application, voiceprint information is further particularly extracted from speech. When an account cannot be uniquely determined by using character string information recognized by means of speech, voiceprint information may be used for uniquely determine the account. In addition, the voiceprint information may be used for determine whether a person recording voice is an owner of the account. If the person recording voice is the owner of the account, friend verification may be skipped, and an account of a counterpart may be directly added.

An objective of the embodiments of this application is to provide a new account adding method for the social platform. If an account of a user needs to be added, a terminal only needs to: collect, by using a microphone, voice about an account stated by the counterpart or directly receive voice (for example, a video call) sent by the counterpart; extract character string information stated by the user and voiceprint information of the user from the voice; and upload the character string information and the voiceprint information to a server. The server searches for a matched account according to the character string information and the voiceprint information, and feeds back the account to the terminal. In this way, an account of a counterpart may be added with no need to enter the account of the counterpart by using a keyboard.

The technical solutions in the embodiments of this application mainly involve two execution bodies: a terminal and a server.

The terminal mainly collects voice information including account information of a user; parses the voice information, and extracts character string information and voiceprint information; and uploads the character string information and the voiceprint information to the server.

The server mainly searches a database for a matched account according to the character string information and the voiceprint information, and feeds back the account to the terminal.

The following further describes the account adding method in the embodiments of this application in detail with reference to specific processing processes.

FIG. 1 is a schematic flowchart of an account adding method according to Embodiment 1 of this application. The account adding method in this embodiment is performed at a client side, e.g., a mobile terminal like a smartphone or a tablet computer that has telephone call function. As shown in FIG. 1, the account adding method includes the following steps:

Step 101: Collect voice information.

In this embodiment of this application, the mobile terminal may be an electronic device such as a mobile phone, a tablet computer, or a notebook computer that have the telephone call function. The voice information is recorded during a telephone call the mobile terminal has with a second terminal. The mobile terminal typically includes one or more processing units (CPU's) for executing modules, programs and/or instructions stored in memory and thereby performing processing operations; one or more network or other communications interfaces; and one or more communication buses for interconnecting these components. The communication buses optionally include circuitry (sometimes called a chipset) that interconnects and controls communications between system components. The mobile terminal also includes a user interface comprising a display device and one or more input device(s) (e.g., keyboard, mouse, touch-sensitive display). In some embodiments, the input device is integrated with the display device. For example, a touch screen includes a touch-sensitive surface integrated with the display device.

Memory includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory may optionally include one or more storage devices remotely located from the CPU(s). Memory, or alternately the non-volatile memory device(s) within memory, comprises a non-transitory computer readable storage medium. In some embodiments, memory, or the computer readable storage medium of the memory stores the following programs, modules and data structures, or a subset thereof: an operating system that includes procedures for handling various basic system services and for performing hardware dependent tasks; and a network communication module that is used for connecting the mobile terminal to other computers or telephones via the one or more communication network interfaces (wired or wireless) and one or more communication networks, such as the Internet, other wide area networks, local area networks, metropolitan area networks, and so on.

In this embodiment of this application, a social networking APP (e.g., instant messaging app) is installed on the terminal. The APP has an account adding function. Particularly, in this embodiment, an account is added in the APP by means of speech. Therefore, a new control is set in an interface of the APP. The control is triggered to enable a function of adding an account by means of speech, thereby invoking a voice collection function of the terminal to collect voice information.

In the solution, the control may be triggered in the following manners: tap, double-tap, a gesture, and slide, but the manners are not limited thereto.

In this embodiment of this application, the voice information is collected during the telephone call with a second terminal. For example, the user of the mobile terminal asks the user at the second terminal to speak his/her account information over the phone call, which is then recorded in one of the following two manners:

Manner 1: The voice information is directly collected by a collection unit of the terminal. Herein, the collection unit may be implemented by a microphone. In an actual application, when a user triggers a control and enables a function of adding an account by means of speech, a counterpart states an account of the counterpart towards a collection unit (for example, a microphone) of a terminal. In this way, the collection unit may obtain voice information including the account. Herein, the account is a social number corresponding to an APP, that is, a social number registered by the counterpart in the APP.

Manner 2: A counterpart records voice about an account of the counterpart by using a terminal of the counterpart, and sends the voice information to a terminal of a user. In this way, the terminal of the user receives the voice information sent by the counterpart. This manner may be used during a voice call or a video call. Alternatively, the counterpart may directly send a piece of voice information to the user.

In some embodiments, the user of the mobile terminal sends an instruction to the mobile terminal before the user at the second terminal starts speaking his/her account information.

Step 102: Parse the voice information, and extract character string information and voiceprint information.

Specifically, silence suppression is performed on the voice information; framing processing is performed on the voice information on which the silence suppression has been performed; a sound feature value is extracted from the voice information on which the framing processing has been performed, the extracted sound feature value representing the voiceprint information; and decoding processing is performed on the extracted sound feature value, to obtain the character string information.

In this embodiment of this application, if the voice information is in a compressed format such as a Moving Picture Experts Group Audio Layer-3 (MP3, Moving Picture Experts Group Audio Layer III) format or a streaming media (WMV, Windows Media Video) format, the voice information in the compressed format needs to be converted into a full-wave file in an uncompressed format such as a pulse code modulation (PCM, Pulse Code Modulation) format or a wave (WAV, wave) format. Other than a file header, the remaining part stored in the WAV file is point data of a sound waveform.

In this embodiment of this application, parsing the voice information is recognizing the voice information. Before the voice information is recognized, silence at the beginning and end of the voice information first needs to be removed, to reduce interference on subsequent steps. The silence removing operation is referred to as silence suppression (VAD, Voice Activity Detection), and a signal processing technology needs to be used.

After silence is removed, framing needs to be performed. Specifically, a framing operation is usually implemented by using a moving-window function. Before framing is performed, some operations such as pre-emphasis are further needs to be performed. Frame overlapping exists. Generally, each frame includes 25 ms, and a frame shift between two frames is 10 ms. Therefore, two frames are overlapped by 15 ms. For example, 0 to 25 ms, 10 ms to 35 ms, 20 ms to 45 ms, . . . are the first frame, the second frame, the third frame, . . . .

After framing is performed, each frame waveform is converted. For example, a mel-frequency cepstral coefficient (MFCC, mel-frequency cepstral coefficient) feature is extracted, to convert each frame waveform into a 12-dimensional vector. The 12 points are extracted according to physiological characteristics of human ears, and the 12 points include all voice information in this frame. This process is also referred to as sound feature value extraction. In an actual application, the sound feature value extraction further includes many operations, such as differencing, mean-variance normalization, Gaussianization, and dimensionality reduction and de-redundancy. A sound feature value is voiceprint information of a user. After a sound feature value is extracted, voice information becomes a matrix with 12 rows (assuming that the sound feature value has 12 dimensions) and N columns, and is referred to as an observation sequence. Herein, N is a total quantity of frames.

The core of speech recognition is recognizing a frame represented by the sound feature value as a status, combining status recognition into phonemes, and combining the phonemes into a word. Specifically, several frames correspond to one status, every three statuses are combined into one phoneme, and several phonemes are combined into one word. A status corresponding to each phoneme is determined by a largest probability that the phoneme corresponds to a status. The probability is determined based on an acoustic model. The acoustic model stores parameters, and a probability corresponding to each status can be determined by using the parameters. A status network is established by using a Hidden Markov model (HMM, Hidden Markov Model). In a speech recognition process, an optimal path needs to be found in the status network, where a probability of this path is the largest. This process is referred to as decoding processing. After decoding processing is performed, character string information corresponding to the voice information is obtained.

In this embodiment of this application, because an account usually includes only some of the 26 letters and 10 digits (some of them may be special characters), an accuracy rate of speech recognition in this embodiment of this application is far higher than that of general recognition such as speech input or speech-to-text. Herein, it is possible that several characters in the middle of the string cannot be recognized. Consequently, complete character string information cannot be obtained by means of recognition, and several segments of character strings may be obtained by means of recognition finally. For example, for "185021?1234", because one character in the middle cannot be recognized, two segments of character strings "185021" and "1234" may be obtained by means of recognition.

In this embodiment of this application, a constraint rule for an account is generally set in an APP. If the extracted character string information includes an invalid character (not meeting the constraint rule), voice information is collected again.

Step 103: Send the character string information and the voiceprint information to a server.

In this embodiment of this application, after extracting the character string information and the voiceprint information from the voice information, the terminal sends the two pieces of information to the server.

In this embodiment of this application, the terminal may encrypt the character string information and the voiceprint information, to ensure security of the character string information and the voiceprint information, and then send the encrypted character string information and voiceprint information to the server. Correspondingly, after receiving the information, the server needs to perform decryption to obtain the character string information and the voiceprint information. Herein, encryption and decryption may be performed by using the following algorithms: Advanced Encryption Standard (AES, Advanced Encryption Standard), Data Encryption Standard (DES, Data Encryption Standard), and a public-key encryption algorithm (RSA, Ron Rivest-Adi Shamir-Leonard Adleman), but the algorithms are not limited thereto.

Step 104: Receive an account that matches the character string information and the voiceprint information and that is sent by the server.

In this embodiment of this application, after receiving the character string information and the voiceprint information that are sent by the terminal, the server obtains, by means of matching, an optimal account from a database according to the character string information and the voiceprint information, and feeds back the account to the terminal. The server first performs initial account matching according to the character string information, and then performs exact account matching according to the voiceprint information.

Herein, a voiceprint (Voiceprint) is a sound wave spectrum that carries speech information and that is displayed on an electro-acoustic instrument. People have different physiological characteristics such as a tongue, a laryngeal cavity, and a nasal cavity, and sound waves of people are different. Generally, there is no much change, and a specific similarity still exists even at the time of disease or operation. When multiple accounts are obtained by means of matching by using the character string information (which may include multiple fields), if the matched accounts are bound to voiceprint information, similarity comparison is performed on voiceprint information corresponding to each account and the voiceprint information extracted from the voice information. Specifically, similarity comparison is performed on feature values. If a similarity is greater than or equal to a first preset threshold, it may be determined that two pieces of voiceprint information belong to a same person, and the account is directly returned to the terminal. If no similarity is greater than or equal to the first preset threshold, an account corresponding to an extremely low similarity is discarded, and only an account for which a similarity is greater than or equal to a second preset threshold is sent to the terminal. Alternatively, a contact list is returned to the user with reference to a character string matching result.

In this embodiment of this application, if several segments of character strings are extracted by the terminal (the reason for occurrence of the several segments of character strings may be that some characters (excluding the first and the last characters) cannot be recognized or extremely long space exists between characters), the server needs to perform account matching by using a regular expression. In addition, the server preferably performs matching on an account that is bound to voiceprint information.

In this embodiment of this application, when finding one matched account, the server performs similarity comparison on the voiceprint information and voiceprint information that corresponds to the matched account; and when a similarity is greater than or equal to a first preset threshold, uses the account as the account matching the voiceprint information. According to a user's settings, if it is set that a friend verification operation is not allowed to be skipped, an account is sent to the terminal, and the user may choose to "add as a friend" or "follow" a friend; if it is set that a friend verification operation is allowed to be skipped, the account is directly added to a contact list to compete friend adding. Herein, the first preset threshold is used to define a similarity. Being greater than or equal to the first preset threshold indicates a relatively high similarity, and it may be determined that two pieces of voiceprint information belong to a same person.

In this embodiment of this application, when finding two or more matched accounts, the server searches for, as the account matching the character string information and the voiceprint information, an account matching the voiceprint information from the two or more matched accounts. Specifically, similarity comparison is performed on the voiceprint information and each piece of the voiceprint information that corresponds to the two or more matched accounts; and when an account for which a similarity is greater than or equal to a first preset threshold exists, the account is used as the account matching the voiceprint information. When no account for which a similarity is greater than or equal to the first preset threshold exists, an account for which a similarity is greater than or equal to a second preset threshold is sent to the terminal, the second preset threshold being less than the first preset threshold. Herein, the second preset threshold is used for removing an account corresponding to an extremely small similarity, so as to send, to the terminal, a contact list including accounts corresponding to large similarities. The user may tap and check the contact list, and select one of the accounts to "add as a friend" or "follow".

Step 105: Add the account to a contact list of the account of the user of the mobile terminal at the social networking application.

In this embodiment of this application, when the user needs to add a friend, the user adds an account only by recording, by using a microphone, voice about an account stated by a counterpart, and does not need to manually enter the account of the counterpart by using a keyboard. After voice is collected, character string information and voiceprint information are extracted. The server finds an account matching the character string information and the voiceprint information and feeds back the account to the terminal. A matching speed of the voiceprint information is slower than that of the character string information, and a range of suitable accounts are obtained by means of matching according to the character string information, and then matching is performed on the range of accounts according to the voiceprint information. Whether a sound belongs to an owner of an account may be determined according to the voiceprint information, and then a determining process of adding a friend may be skipped. The user and the counterpart directly become friends, and can start chatting. Compared with adding a friend by means of speech in the existing technology, in this embodiment of this application, a voiceprint information matching operation is added, improving an accuracy rate of account matching. When a similarity between entered voiceprint information and voiceprint information bound to an account is greater than a threshold, a friend verification process may be skipped and two persons may directly become friends, simplifying steps. This prevents a user from entering a complex and tedious social number in a social networking APP, especially a tedious case-sensitive social number including a special character. In some embodiment, the social networking APP generates a chat room with the newly added account at the mobile terminal by sending a predefined greeting message to the account at the second terminal. The greeting message may include other contact information of the user of the mobile terminal (e.g., phone number, email address, physical address, company information, etc.). By the same token, the second terminal may also send a greeting message to the user of the mobile terminal using the same chat room, the greeting message including the contact information of the user of the second terminal. The technical solution in this embodiment of this application is especially applicable in a multi-language environment and to the handicapped, the elder, children, and the like.

Main application scenarios of the technical solution in this embodiment of this application are as follows:

(1) When two users want to add each other as a friend, the two users select to use an "add as a friend by speech" function in a friend adding page. The user taps a speed input key to complete speech input after the other party states an account. Then, the user processes voice information collected by a microphone, to extract character string information and voiceprint information. The user uploads the character string information and the voiceprint information to a server. The server obtains a suitable account from a database by means of matching.

(2) Account information (voice information) of some special persons or organizations may be posted to a public network. Other people may quickly add these accounts as friends or follow these accounts according to the account information (voice information).

Figure 2:
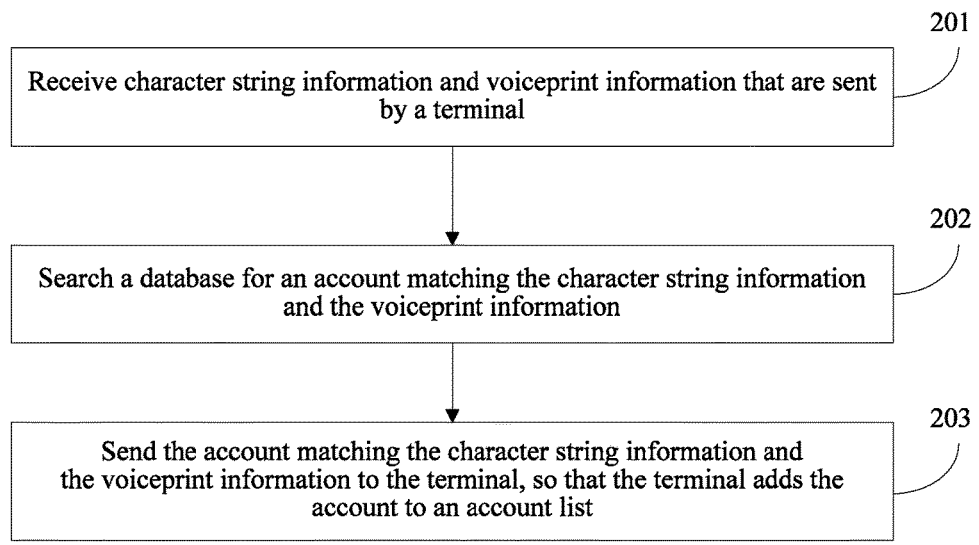
FIG. 2 is a schematic flowchart of an account adding method according to Embodiment 2 of this application.

FIG. 2 is a schematic flowchart of an account adding method according to Embodiment 2 of this application. The account adding method in this embodiment is applied to a server side. As shown in FIG. 2, the account adding method includes the following steps:

Step 201: Receive character string information and voiceprint information that are sent by a terminal.

In this embodiment of this application, the terminal may be an electronic device such as a mobile phone, a tablet computer, or a notebook computer. A social networking APP is installed on the terminal. The APP has an account adding function. Particularly, in this embodiment, an account is added in the APP by means of speech. Therefore, a new control is set in an interface of the APP. The control is triggered to enable a function of adding an account by means of speech, thereby invoking a voice collection function of the terminal to collect voice information. The terminal parses the voice information, and extracts character string information and voiceprint information. Specifically, the terminal performs silence suppression on the voice information; performs framing processing on the voice information on which the silence suppression has been performed; extracts a sound feature value from the voice information on which the framing processing has been performed, the extracted sound feature value representing the voiceprint information; and performs decoding processing on the extracted sound feature value, to obtain the character string information.

A server receives the character string information and the voiceprint information that are sent by the terminal.

Step 202: Search a database for an account matching the character string information and the voiceprint information.

In this embodiment of this application, after receiving the character string information and the voiceprint information that are sent by the terminal, the server obtains, by means of matching, an optimal account from a database according to the character string information and the voiceprint information, and feeds back the account to the terminal. The server first performs initial account matching according to the character string information, and then performs exact account matching according to the voiceprint information.

Herein, a voiceprint (Voiceprint) is a sound wave spectrum that carries speech information and that is displayed on an electro-acoustic instrument. People have different physiological characteristics such as a tongue, a laryngeal cavity, and a nasal cavity, and sound waves of people are different. Generally, there is no much change, and a specific similarity still exists even at the time of disease or operation. When multiple accounts are obtained by means of matching by using the character string information (which may include multiple fields), if the matched accounts are bound to voiceprint information, similarity comparison is performed on voiceprint information corresponding to each account and the voiceprint information extracted from the voice information. Specifically, similarity comparison is performed on feature values. If a similarity is greater than or equal to a first preset threshold, it may be determined that two pieces of voiceprint information belong to a same person, and the account is directly returned to the terminal. If no similarity is greater than or equal to the first preset threshold, an account corresponding to an extremely low similarity is discarded, and only an account for which a similarity is greater than or equal to a second preset threshold is sent to the terminal. Alternatively, a contact list is returned to the user with reference to a character string matching result.

In this embodiment of this application, if several segments of character strings are extracted by the terminal (the reason for occurrence of the several segments of character strings may be that some characters (excluding the first and the last characters) cannot be recognized or extremely long space exists between characters), the server needs to perform account matching by using a regular expression. In addition, the server preferably performs matching on an account that is bound to voiceprint information.

In this embodiment of this application, when finding one matched account, the server performs similarity comparison on the voiceprint information and voiceprint information that corresponds to the matched account; and when a similarity is greater than or equal to a first preset threshold, uses the account as the account matching the voiceprint information. According to a user's settings, if it is set that a friend verification operation is not allowed to be skipped, an account is sent to the terminal, and the user may choose to "add as a friend" or "follow" a friend; if it is set that a friend verification operation is allowed to be skipped, the account is directly added to a contact list to compete friend adding. Herein, the first preset threshold is used to define a similarity. Being greater than or equal to the first preset threshold indicates a relatively high similarity, and it may be determined that two pieces of voiceprint information belong to a same person.

In this embodiment of this application, when finding two or more matched accounts, the server searches for, as the account matching the character string information and the voiceprint information, an account matching the voiceprint information from the two or more matched accounts. Specifically, similarity comparison is performed on the voiceprint information and each piece of the voiceprint information that corresponds to the two or more matched accounts; and when an account for which a similarity is greater than or equal to a first preset threshold exists, the account is used as the account matching the voiceprint information. When no account for which a similarity is greater than or equal to the first preset threshold exists, an account for which a similarity is greater than or equal to a second preset threshold is sent to the terminal, the second preset threshold being less than the first preset threshold. Herein, the second preset threshold is used for removing an account corresponding to an extremely small similarity, so as to send, to the terminal, a contact list including accounts corresponding to large similarities. The user may tap and check the contact list, and select one of the accounts to "add as a friend" or "follow".

Step 203: Send the account matching the character string information and the voiceprint information to the terminal, so that the terminal adds the account to a contact list.

This embodiment of this application provides, to a user, an intuitive, quick, and effective method for adding a counterpart as a friend. When a friend is to be added, an "add as a friend by speech" function is enabled, and friend adding can be completed after the counterpart states an account of the counterpart. In addition, for account security, whether a user of a current account is an owner of the account is determined by using voiceprint information. If voiceprint information of a stated number is consistent with voiceprint information of the account, a friend verification process may be directly skipped, and a counterpart may be directly added as a friend.

Figure 3:
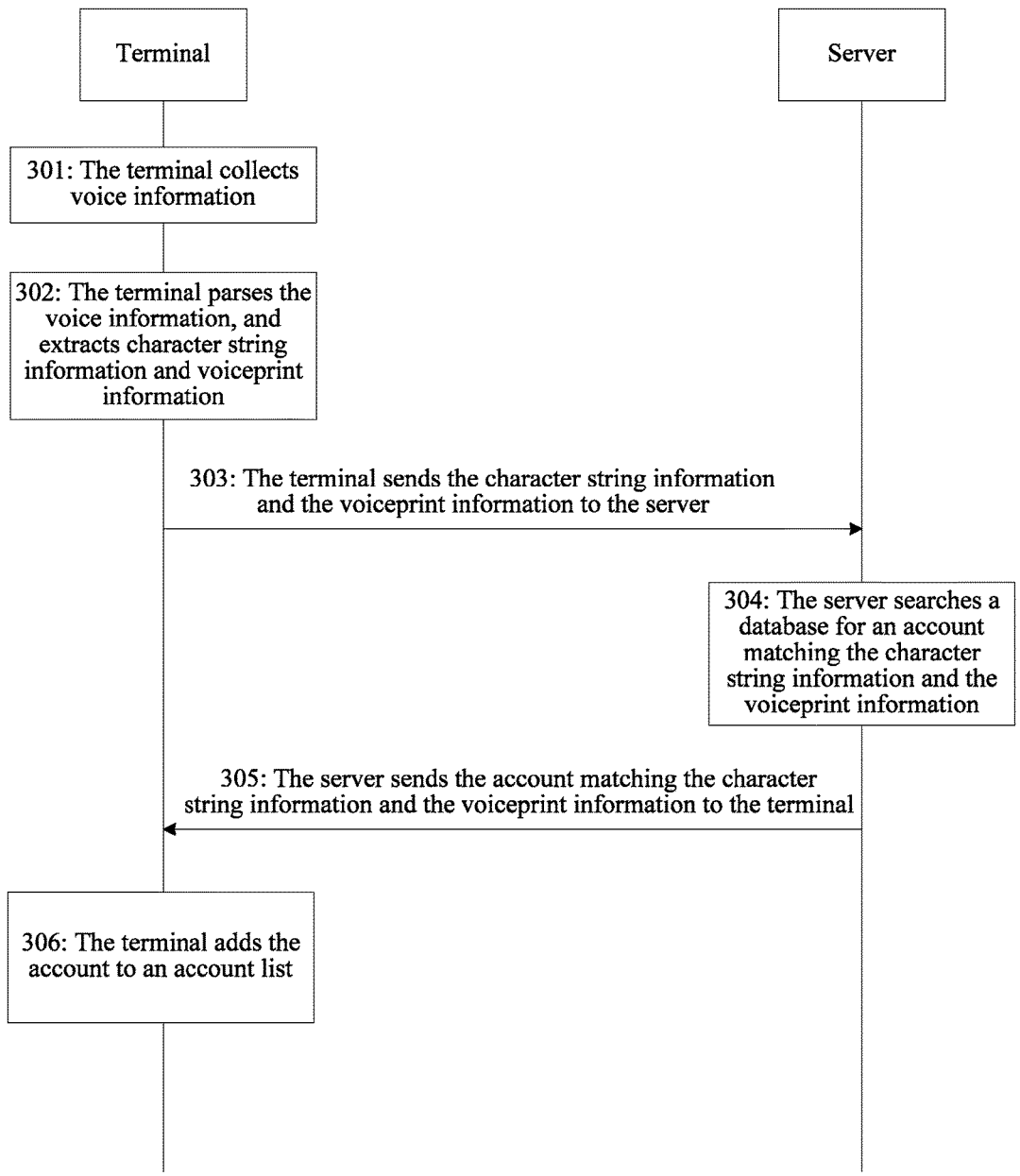
FIG. 3 is a schematic flowchart of an account adding method according to Embodiment 3 of this application.

FIG. 3 is a schematic flowchart of an account adding method according to Embodiment 3 of this application. The account adding method in this embodiment is applied to a terminal and a server. As shown in FIG. 3, the account adding method includes the following steps:

Step 301: The terminal collects voice information.

In this embodiment of this application, the terminal may be an electronic device such as a mobile phone, a tablet computer, or a notebook computer.

In this embodiment of this application, a social networking APP is installed on the terminal. The APP has an account adding function. Particularly, in this embodiment, an account is added in the APP by means of speech. Therefore, a new control is set in an interface of the APP. The control is triggered to enable a function of adding an account by means of speech, thereby invoking a voice collection function of the terminal to collect voice information.

In the solution, the control may be triggered in the following manners: tap, double-tap, a gesture, and slide, but the manners are not limited thereto.

In this embodiment of this application, the voice information is collected in the following two manners:

Manner 1: The voice information is directly collected by a collection unit of the terminal. Herein, the collection unit may be implemented by a microphone. In an actual application, when a user triggers a control and enables a function of adding an account by means of speech, a counterpart states an account of the counterpart towards a collection unit (for example, a microphone) of a terminal. In this way, the collection unit may obtain voice information including the account. Herein, the account is a social number corresponding to an APP, that is, a social number registered by the counterpart in the APP.

Manner 2: A counterpart records voice about an account of the counterpart by using a terminal of the counterpart, and sends the voice information to a terminal of a user. In this way, the terminal of the user receives the voice information sent by the counterpart. This manner may be used during a voice call or a video call. Alternatively, the counterpart may directly send a piece of voice information to the user.

Step 302: The terminal parses the voice information, and extracts character string information and voiceprint information.

Specifically, silence suppression is performed on the voice information; framing processing is performed on the voice information on which the silence suppression has been performed; a sound feature value is extracted from the voice information on which the framing processing has been performed, the extracted sound feature value representing the voiceprint information; and decoding processing is performed on the extracted sound feature value, to obtain the character string information.

In this embodiment of this application, if the voice information is in a compressed format such as an MP3 format or a WMV format, the voice information in the compressed format needs to be converted into a full-wave file in an uncompressed format such as a PCM format or a WAV format. Other than a file header, the remaining part stored in the WAV file is point data of a sound waveform.

In this embodiment of this application, parsing the voice information is recognizing the voice information. Before the voice information is recognized, silence at the beginning and end of the voice information first needs to be removed, to reduce interference on subsequent steps. The silence removing operation is referred to as VAD, and a signal processing technology needs to be used.

After silence is removed, framing needs to be performed. Specifically, a framing operation is usually implemented by using a moving-window function. Before framing is performed, some operations such as pre-emphasis are further needs to be performed. Frame overlapping exists. Generally, each frame includes 25 ms, and a frame shift between two frames is 10 ms. Therefore, two frames are overlapped by 15 ms. For example, 0 to 25 ms, 10 ms to 35 ms, 20 ms to 45 ms, . . . are the first frame, the second frame, the third frame, . . . .

After framing is performed, each frame waveform is converted. For example, a mel-frequency cepstral coefficient (MFCC, mel-frequency cepstral coefficient) feature is extracted, to convert each frame waveform into a 12-dimensional vector. The 12 points are extracted according to physiological characteristics of human ears, and the 12 points include all voice information in this frame. This process is also referred to as sound feature value extraction. In an actual application, the sound feature value extraction further includes many operations, such as differencing, mean-variance normalization, Gaussianization, and dimensionality reduction and de-redundancy. A sound feature value is voiceprint information of a user. After a sound feature value is extracted, voice information becomes a matrix with 12 rows (assuming that the sound feature value has 12 dimensions) and N columns, and is referred to as an observation sequence. Herein, N is a total quantity of frames.

The core of speech recognition is recognizing a frame represented by the sound feature value as a status, combining status recognition into phonemes, and combining the phonemes into a word. Specifically, several frames correspond to one status, every three statuses are combined into one phoneme, and several phonemes are combined into one word. A status corresponding to each phoneme is determined by a largest probability that the phoneme corresponds to a status. The probability is determined based on an acoustic model. The acoustic model stores parameters, and a probability corresponding to each status can be determined by using the parameters. A status network is established by using an HMM. In a speech recognition process, an optimal path needs to be found in the status network, where a probability of this path is the largest. This process is referred to as decoding processing. After decoding processing is performed, character string information corresponding to the voice information is obtained.

In this embodiment of this application, because an account usually includes only some of the 26 letters and 10 digits (some of them may be special characters), an accuracy rate of speech recognition in this embodiment of this application is far higher than that of general recognition such as speech input or speech-to-text. Herein, it is possible that several characters (excluding the first and the last characters) cannot be recognized. Consequently, complete character string information cannot be obtained by means of recognition, and several segments of character strings may be obtained by means of recognition finally. For example, for "185021?1234", because one character in the middle cannot be recognized, two segments of character strings "185021" and "1234" may be obtained by means of recognition.

In this embodiment of this application, a constraint rule for an account is generally set in an APP. If the extracted character string information includes an invalid character (not meeting the constraint rule), voice information is collected again.

Step 303: The terminal sends the character string information and the voiceprint information to the server.

In this embodiment of this application, after extracting the character string information and the voiceprint information from the voice information, the terminal sends the two pieces of information to the server.

In this embodiment of this application, the terminal may encrypt the character string information and the voiceprint information, to ensure security of the character string information and the voiceprint information, and then send the encrypted character string information and voiceprint information to the server. Correspondingly, after receiving the information, the server needs to perform decryption to obtain the character string information and the voiceprint information. Herein, encryption and decryption may be performed by using the following algorithms: AES, DES, and RSA, but the algorithms are not limited thereto.

Step 304: The server searches a database for an account matching the character string information and the voiceprint information.

In this embodiment of this application, after receiving the character string information and the voiceprint information that are sent by the terminal, the server obtains, by means of matching, an optimal account from a database according to the character string information and the voiceprint information, and feeds back the account to the terminal. The server first performs initial account matching according to the character string information, and then performs exact account matching according to the voiceprint information.

Herein, a voiceprint is a sound wave spectrum that carries speech information and that is displayed on an electro-acoustic instrument. People have different physiological characteristics such as a tongue, a laryngeal cavity, and a nasal cavity, and sound waves of people are different. Generally, there is no much change, and a specific similarity still exists even at the time of disease or operation. When multiple accounts are obtained by means of matching by using the character string information (which may include multiple fields), if the matched accounts are bound to voiceprint information, similarity comparison is performed on voiceprint information corresponding to each account and the voiceprint information extracted from the voice information. Specifically, similarity comparison is performed on feature values. If a similarity is greater than or equal to a first preset threshold, it may be determined that two pieces of voiceprint information belong to a same person, and the account is directly returned to the terminal. If no similarity is greater than or equal to the first preset threshold, an account corresponding to an extremely low similarity is discarded, and only an account for which a similarity is greater than or equal to a second preset threshold is sent to the terminal. Alternatively, a contact list is returned to the user with reference to a character string matching result.

In this embodiment of this application, if several segments of character strings are extracted by the terminal (the reason for occurrence of the several segments of character strings may be that some characters (excluding the first and the last characters) cannot be recognized or extremely long space exists between characters), the server needs to perform account matching by using a regular expression. In addition, the server preferably performs matching on an account that is bound to voiceprint information.

In this embodiment of this application, when finding one matched account, the server performs similarity comparison on the voiceprint information and voiceprint information that corresponds to the matched account; and when a similarity is greater than or equal to a first preset threshold, uses the account as the account matching the voiceprint information. According to a user's settings, if it is set that a friend verification operation is not allowed to be skipped, an account is sent to the terminal, and the user may choose to "add as a friend" or "follow" a friend; if it is set that a friend verification operation is allowed to be skipped, the account is directly added to a contact list to compete friend adding. Herein, the first preset threshold is used to define a similarity. Being greater than or equal to the first preset threshold indicates a relatively high similarity, and it may be determined that two pieces of voiceprint information belong to a same person.

In this embodiment of this application, when finding two or more matched accounts, the server searches for, as the account matching the character string information and the voiceprint information, an account matching the voiceprint information from the two or more matched accounts. Specifically, similarity comparison is performed on the voiceprint information and each piece of the voiceprint information that corresponds to the two or more matched accounts; and when an account for which a similarity is greater than or equal to a first preset threshold exists, the account is used as the account matching the voiceprint information. When no account for which a similarity is greater than or equal to the first preset threshold exists, an account for which a similarity is greater than or equal to a second preset threshold is sent to the terminal, the second preset threshold being less than the first preset threshold. Herein, the second preset threshold is used for removing an account corresponding to an extremely small similarity, so as to send, to the terminal, a contact list including accounts corresponding to large similarities. The user may tap and check the contact list, and select one of the accounts to "add as a friend" or "follow".

Step 305: The server sends the account matching the character string information and the voiceprint information to the terminal.

Step 306: The terminal adds the account to a contact list.

The technical solution in this embodiment of this application involves binding an account to voiceprint information. After the account is bound to the voiceprint information, voiceprint information matching is performed on the account by means of speech recognition, making a matching result more accurate. In addition, after the account is bound to the voiceprint information, the account is more secure. The following describes a process of binding voiceprint information corresponding to an account in detail.

Figure 4:
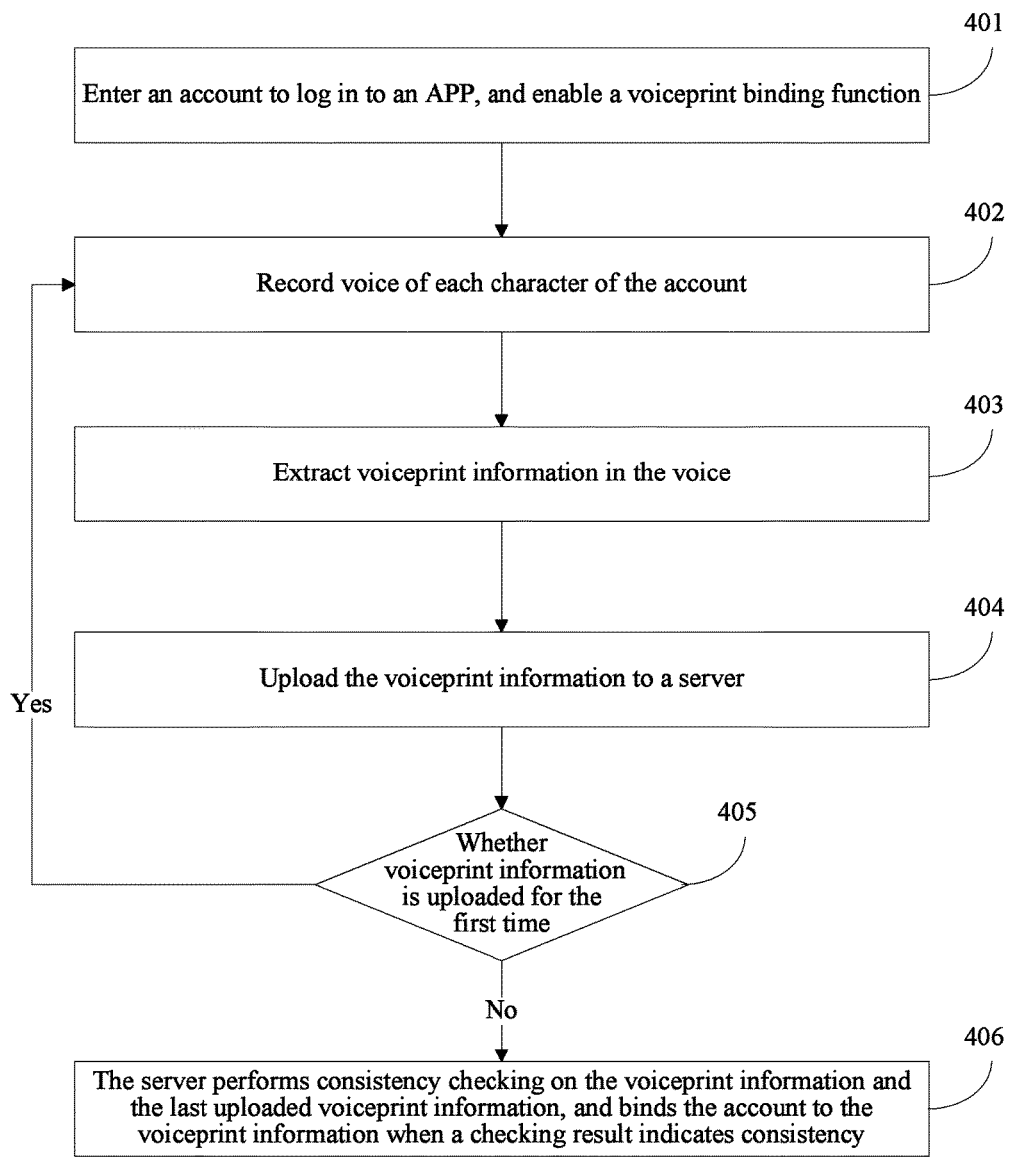
FIG. 4 is a schematic flowchart of binding voiceprint information corresponding to an account according to an embodiment of this application.

FIG. 4 is a schematic flowchart of binding voiceprint information corresponding to an account according to an embodiment of this application. As shown in FIG. 4, the process of binding voiceprint information corresponding to an account includes the following steps:

Step 401: Enter an account to log in to an APP, and enable a voiceprint binding function.

Step 402: Record voice of each character of the account.

Step 403: Extract voiceprint information in the voice.

Step 404: Upload the voiceprint information to a server.

Step 405: Perform step 402 when voiceprint information is uploaded for the first time; and perform step 406 when new voiceprint information is uploaded.

Step 406: The server performs consistency checking on the voiceprint information and the last uploaded voiceprint information, and binds the account to the voiceprint information when a checking result indicates consistency.

Figure 5:
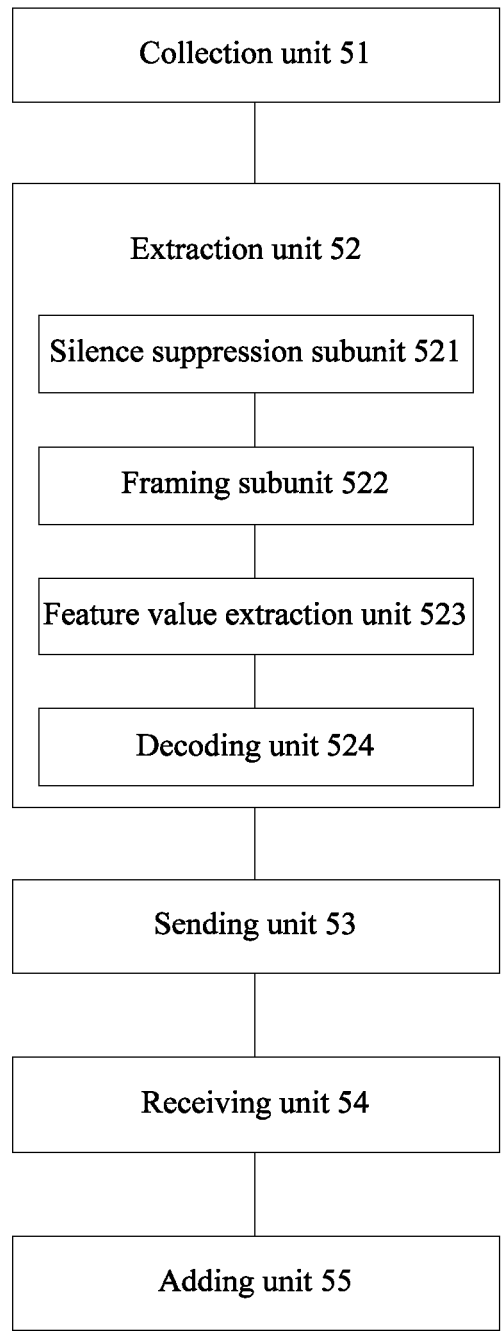
FIG. 5 is a schematic structural composition diagram of a terminal according to an embodiment of this application.

FIG. 5 is a schematic structural composition diagram of a terminal according to an embodiment of this application. As shown in FIG. 5, the terminal includes:

a collection unit 51, configured to collect voice information;

an extraction unit 52, configured to parse the voice information, and extract character string information and voiceprint information;

a sending unit 53, configured to send the character string information and the voiceprint information to a server;

a receiving unit 54, configured to receive an account that matches the character string information and the voiceprint information and that is sent by the server; and an adding unit 55, configured to add the account to a contact list.

The extraction unit 52 includes:

a silence suppression subunit 521, configured to perform silence suppression on the voice information;

a framing subunit 522, configured to perform framing processing on the voice information on which the silence suppression has been performed;

a feature value extraction unit 523, configured to extract a sound feature value from the voice information on which the framing processing has been performed, the extracted sound feature value representing the voiceprint information; and a decoding unit 524, configured to perform decoding processing on the extracted sound feature value, to obtain the character string information.

A person skilled in the art should understand that functions implemented by the units of the terminal shown in FIG. 5 may be understood with reference to the related descriptions of the account adding method. The functions of the units of the terminal shown in FIG. 5 may be implemented by using a program running in a processor, or may be implemented by using a specific logic circuit.

Figure 6:
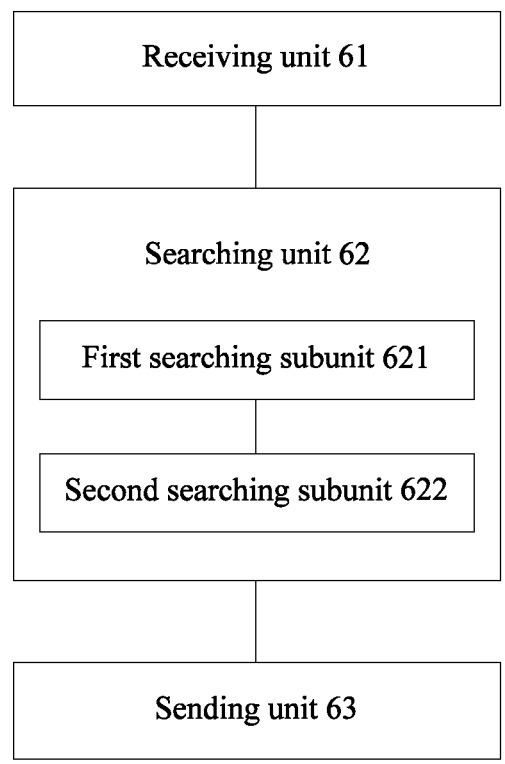
FIG. 6 is a schematic structural composition diagram of a server according to an embodiment of this application.

FIG. 6 is a schematic structural composition diagram of a server according to an embodiment of this application. As shown in FIG. 6, the server includes:

a receiving unit 61, configured to receive character string information and voiceprint information that are sent by a terminal;

a searching unit 62, configured to search a database for an account matching the character string information and the voiceprint information; and a sending unit 63, configured to send the account matching the character string information and the voiceprint information to the terminal, so that the terminal adds the account to a contact list.

The searching unit 62 includes:

a first searching subunit 621, configured to search the database for an account matching the character string information; and a second searching subunit 622, configured to: when two or more matched accounts are found, search for, as the account matching the character string information and the voiceprint information, an account matching the voiceprint information from the two or more matched accounts.

The database stores voiceprint information that corresponds to the two or more matched accounts.

The second searching subunit 622 is further configured to: perform similarity comparison on the voiceprint information and each piece of the voiceprint information that corresponds to the two or more matched accounts; and when an account for which a similarity is greater than or equal to a first preset threshold exists, use the account as the account matching the voiceprint information.

The sending unit 63 is further configured to: when no account for which a similarity is greater than or equal to the first preset threshold exists, send an account for which a similarity is greater than or equal to a second preset threshold to the terminal, the second preset threshold being less than the first preset threshold.

The second searching subunit 622 is further configured to: when one matched account is found, perform similarity comparison on the voiceprint information and voiceprint information that corresponds to the matched account; and when a similarity is greater than or equal to a first preset threshold, use the account as the account matching the voiceprint information.

A person skilled in the art should understand that functions implemented by the units of the server shown in FIG. 6 may be understood with reference to the related descriptions of the account adding method. The functions of the units of the server shown in FIG. 6 may be implemented by using a program running in a processor, or may be implemented by using a specific logic circuit.

When the integrated modules in the embodiments of this application are implemented in the form of a software functional module and sold or used as an independent product, the modules may be stored in a computer-readable storage medium. Based on this, a person skilled in the art should understand that the embodiments of this application may be provided as a method, a system, or a computer program product. Therefore, this application may use a form of a hardware embodiment, a software embodiment, or an embodiment combining software and hardware. In addition, this application may use a form of a computer program product implemented on one or more computer-sensitive storage media including computer-sensitive program code. The storage medium includes but is not limited to a USB drive, a mobile hard disk, a read-only memory (ROM, Read-Only Memory), a random access memory (RAM, Random Access Memory), a magnetic disk storage device, a CD-ROM, an optical memory, and the like.

This application is described with reference to flowcharts and/or block diagrams of the method, device (system), and computer program product in the embodiments of this application. It should be understood that computer program instructions can implement each process and/or block in the flowcharts and/or block diagrams and a combination of processes and/or blocks in the flowcharts and/or block diagrams. These computer program instructions may be provided to a general-purpose computer, a dedicated computer, an embedded processor, or a processor of another programmable data processing device to generate a machine, so that an apparatus configured to implement functions specified in one or more processes in the flowcharts and/or one or more blocks in the block diagrams is generated by using instructions executed by the general-purpose computer or the processor of another programmable data processing device.

These computer program instructions may also be stored in a computer readable memory that can instruct the computer or any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may alternatively be loaded onto a computer or another programmable data processing device, so that a series of operations and steps are performed on the computer or the another programmable device, thereby generating computer-implemented processing. Therefore, the instructions executed on the computer or another programmable device provides steps for implementing a specific function in one or more processes in the flowcharts and/or in one or more blocks in the block diagrams.

Although preferable embodiments of this application have been described, once a person skilled in the art learns a basic creative concept, other variations and modifications may be made to the embodiments. Therefore, the appended claims are intended to be construed as including the preferable embodiments and all variations and modifications that fall within the scope of this application.

Correspondingly, an embodiment of this application further provides a computer readable storage medium storing a computer program, the computer program being used for executing the account adding method in the embodiments of this application.

The technical solutions of the embodiments of this application may be randomly combined in a condition without conflict.

In the several embodiments provided in this application, it should be understood that the disclosed method and smart device may be implemented in other manners. The described device embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections between the components may be implemented by using some interfaces. The indirect couplings or communication connections between the devices or units may be implemented in electronic, mechanical, or other forms.

The units described as separate parts may or may not be physically separate, and the parts displayed as units may or may not be physical units, that is, may be located in one position, or may be distributed on a plurality of network units. Some or all of the units may be selected to achieve the objectives of the solutions of the embodiments according to actual needs.

In addition, the functional units in the embodiments of this application may be integrated into one processing unit, or each of the units may exist alone physically, or two or more units may be integrated into one unit. The integrated units may be implemented in a form of hardware, or may be implemented in a form of a software functional unit.

The foregoing descriptions are merely specific implementations of this application, but are not intended to limit the protection scope of this application. Any variation or replacement readily figured out by a person skilled in the art within the technical scope disclosed in this application shall fall within the protection scope of this application.

What is claimed is:

1. An account adding method performed by a social networking application running at a mobile terminal having one or more processors and memory storing a plurality of programs to be executed by the one or more processors, the method comprising:
    recording voice information from a second terminal using the social networking application;
    extracting character string information and voiceprint information from the voice information, wherein the extracting includes:
        extracting a sound feature value from the voice information, wherein the extracted sound feature value represents the voiceprint information; and
        performing decoding processing on the extracted sound feature value to obtain the character string information;
    sending the character string information and the extracted sound feature value to a server, wherein the server is configured to perform similarity comparison on sound feature values and the character string information corresponding to a plurality of accounts and the extracted sound feature value representing the voiceprint information and the character string information, respectively;
    in response to the similarity comparison performed by the server, receiving from the server an identification of a matching account that matches the character string information and the extracted sound feature value, wherein the matching account includes a similarity value that is greater than or equal to a first preset threshold; and
    adding the matching account to a contact list of the social networking application.

2. The account adding method according to claim 1, further comprising:
    generating a chat room with the matching account by sending a predefined message to the matching account.

3. The account adding method according to claim 1, wherein the operation of extracting character string information and voiceprint information from the voice information further comprises:
    performing silence suppression on the voice information; and
    performing framing processing on the voice information on which the silence suppression has been performed and
    wherein the extracting the sound feature value from the voice information further comprises extracting the sound feature value from the voice information on which the framing processing has been performed.

4. The account adding method according to claim 1, wherein the social networking application is started before starting a telephone call with the second terminal and the voice information is recorded during the telephone call.

5. The account adding method according to claim 4, wherein the voice information is recorded in response to a user instruction to the social networking application.

6. The account adding method according to claim 1, wherein the server is configured to search a database for an account matching the character string information and the voiceprint information.

7. The account adding method according to claim 6, wherein the server is further configured to:
    search the database for an account matching the character string information; and
    when two or more matched accounts are found, search for, as the account matching the character string information and the voiceprint information, an account matching the voiceprint information from the two or more matched accounts.

8. The account adding method according to claim 7, wherein the server is further configured to:

perform similarity comparison on the voiceprint information and each piece of the voiceprint information that corresponds to the two or more matched accounts; and when an account for which a similarity is greater than or equal to a first preset threshold exists, use the account as the account matching the voiceprint information.

9. The account adding method according to claim 8, wherein the server is further configured to:

when no account for which a similarity is greater than or equal to the first preset threshold exists, send an account for which a similarity is greater than or equal to a second preset threshold to the terminal, the second preset threshold being less than the first preset threshold.

10. A mobile terminal, comprising:

one or more processors;

memory; and at least one program stored in the memory that, when executed by the one or more processors, causes the mobile terminal to perform a plurality of operations including:

recording voice information from a second terminal using the social networking application;

extracting character string information and voiceprint information from the voice information, wherein the extracting includes:

extracting a sound feature value from the voice information, wherein the extracted sound feature value represents the voiceprint information; and performing decoding processing on the extracted sound feature value to obtain the character string information;

sending the character string information and the extracted sound feature value to a server, wherein the server is configured to perform similarity comparison on sound feature values and the character string information corresponding to a plurality of accounts and the extracted sound feature value representing the voiceprint information and the character string information, respectively;

in response to the similarity comparison performed by the server, receiving from the server an identification of a matching account that matches the character string information and the extracted sound feature value, wherein the matching account includes a similarity value that is greater than or equal to a first preset threshold; and adding the matching account to a contact list of the social networking application.

11. The mobile terminal according to claim 10, wherein the plurality of operations further comprises:

generating a chat room with the matching account by sending a predefined message to the matching account.

12. The mobile terminal according to claim 10, wherein the operation of extracting character string information and voiceprint information from the voice information further comprises:

performing silence suppression on the voice information; and performing framing processing on the voice information on which the silence suppression has been performed, and wherein the extracting the sound feature value from the voice information further comprises extracting the sound feature value from the voice information on which the framing processing has been performed.

13. The mobile terminal according to claim 10, wherein the social networking application is started before starting a telephone call with the second terminal and the voice information is recorded during the telephone call.

14. The mobile terminal according to claim 13, wherein the voice information is recorded in response to a user instruction to the social networking application.

15. A non-transitory computer readable storage medium storing at least one computer executable program that is configured to be executed by one or more processors of a mobile terminal for performing a plurality of operations including:

recording voice information from a second terminal using the social networking application;

extracting character string information and voiceprint information from the voice information, wherein the extracting includes:

extracting a sound feature value from the voice information, wherein the extracted sound feature value represents the voiceprint information; and performing decoding processing on the extracted sound feature value to obtain the character string information;

sending the character string information and the extracted sound feature value to a server, wherein the server is configured to perform similarity comparison on sound feature values and the character string information corresponding to a plurality of accounts and the extracted sound feature value representing the voiceprint information and the character string information, respectively;

in response to the similarity comparison performed by the server, receiving from the server an identification of a matching account that matches the character string information and the extracted sound feature value, wherein the matching account includes a similarity value that is greater than or equal to a first preset threshold; and adding the matching account to a contact list of the social networking application.

16. The non-transitory computer readable storage medium according to claim 15, wherein the plurality of operations further comprises:

generating a chat room with the matching account by sending a predefined message to the matching account.

17. The non-transitory computer readable storage medium according to claim 15, wherein the operation of extracting character string information and voiceprint information from the voice information comprises:

performing silence suppression on the voice information;

performing framing processing on the voice information on which the silence suppression has been performed;

extracting a sound feature value from the voice information on which the framing processing has been performed, the extracted sound feature value representing the voiceprint information; and performing decoding processing on the extracted sound feature value, to obtain the character string information.

18. The non-transitory computer readable storage medium according to claim 15, wherein the social networking application is started before starting a telephone call with the second terminal and the voice information is recorded during the telephone call.

19. The non-transitory computer readable storage medium according to claim 18, wherein the voice information is recorded in response to a user instruction to the social networking application.

* * * * *